E. M. SCHANTZ.
COMPUTING SCALE.
APPLICATION FILED MAY 8, 1912.

1,273,414.

Patented July 23, 1918.
14 SHEETS—SHEET 1.

Witnesses:

Inventor:
Edwin M. Schantz
By
Sheridan, Wilkinson, Scott & Richmond
Attys

E. M. SCHANTZ.
COMPUTING SCALE.
APPLICATION FILED MAY 8, 1912.

1,273,414.

Patented July 23, 1918.
14 SHEETS—SHEET 2.

Witnesses:
C. E. Burnap
M. T. Kilroy

Inventor:
Edwin M. Schantz
By Sheridan, Wilkinson, Scott & Richmond
Att'ys

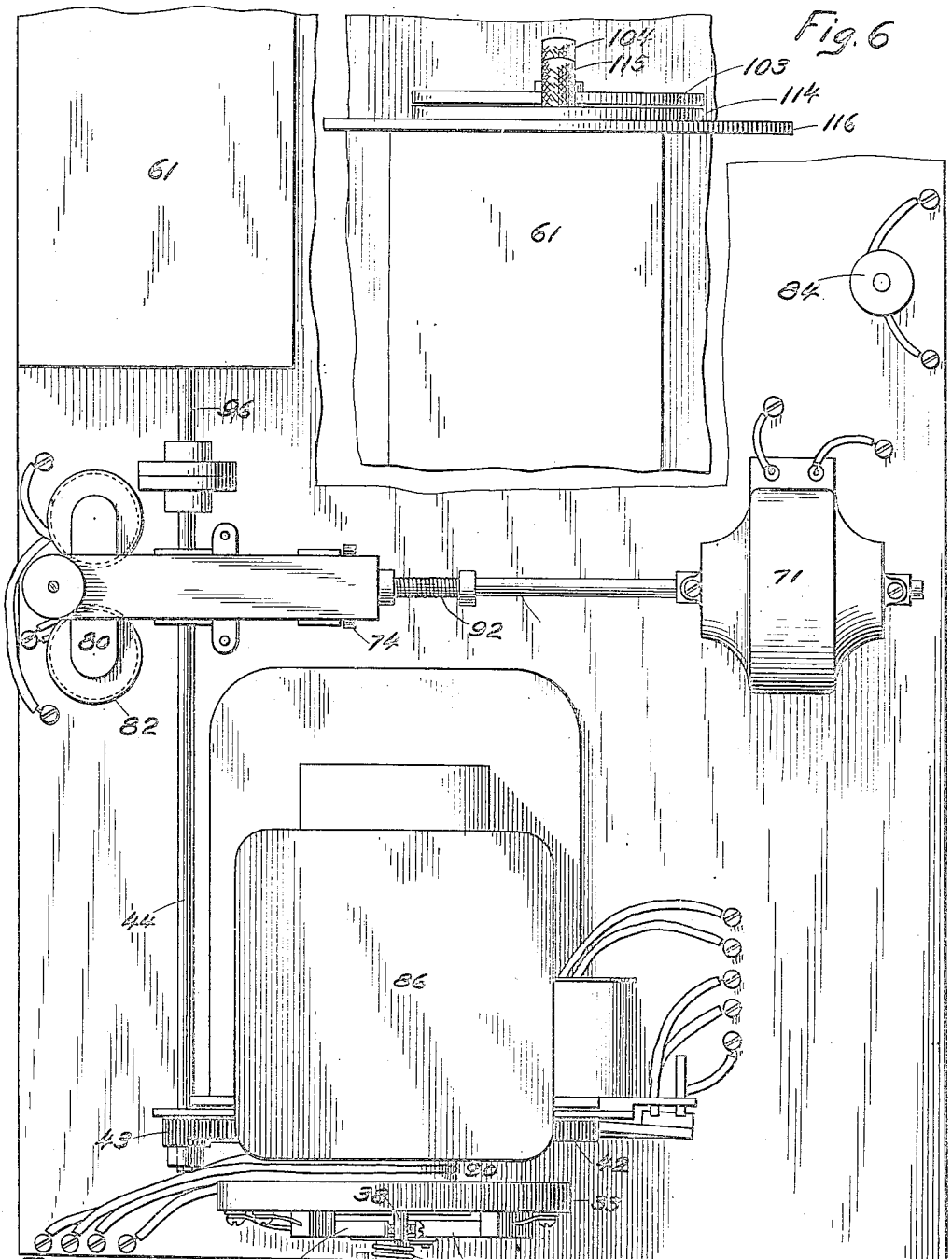

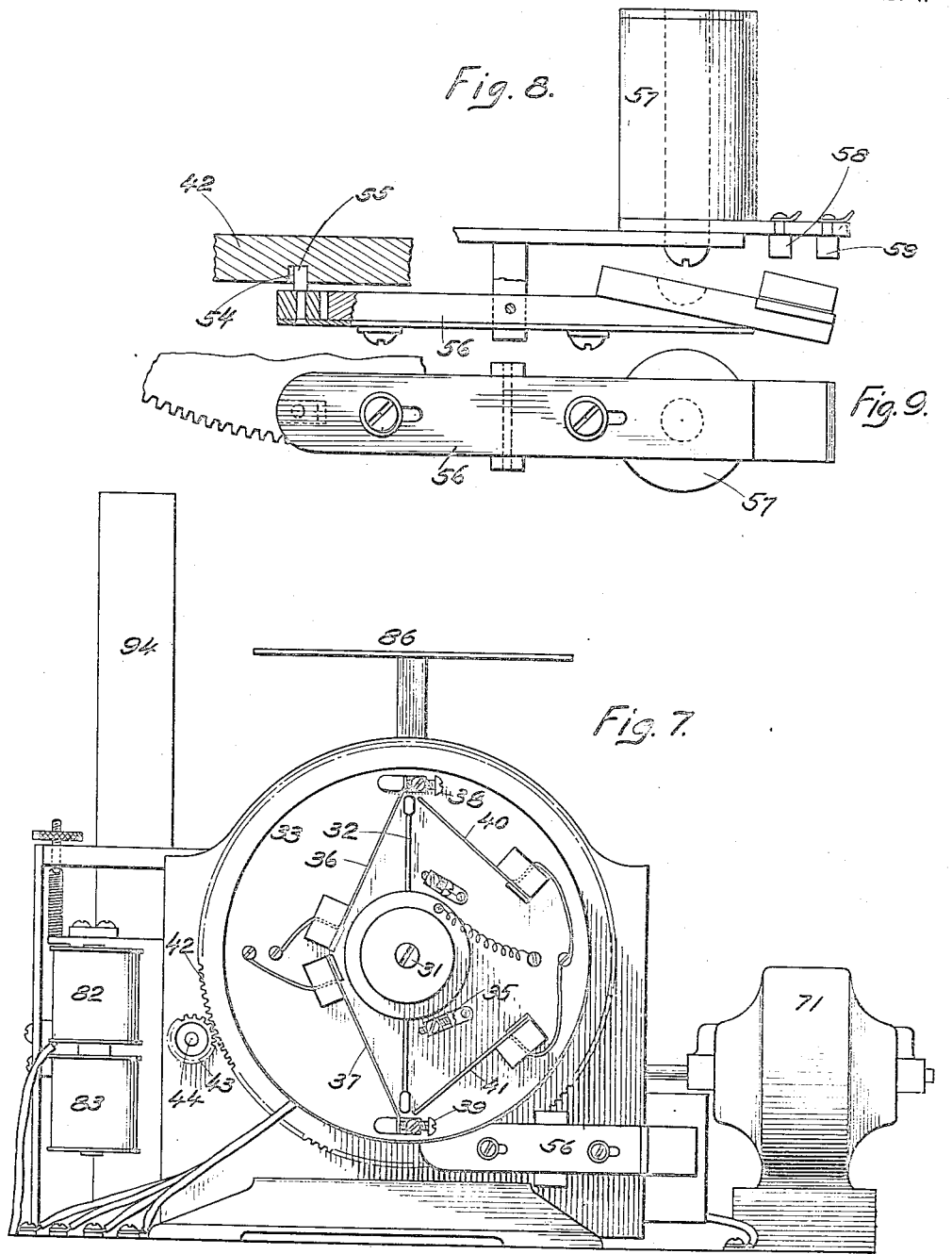

E. M. SCHANTZ.
COMPUTING SCALE.
APPLICATION FILED MAY 8, 1912.
1,273,414.
Patented July 23, 1918.
14 SHEETS—SHEET 5.
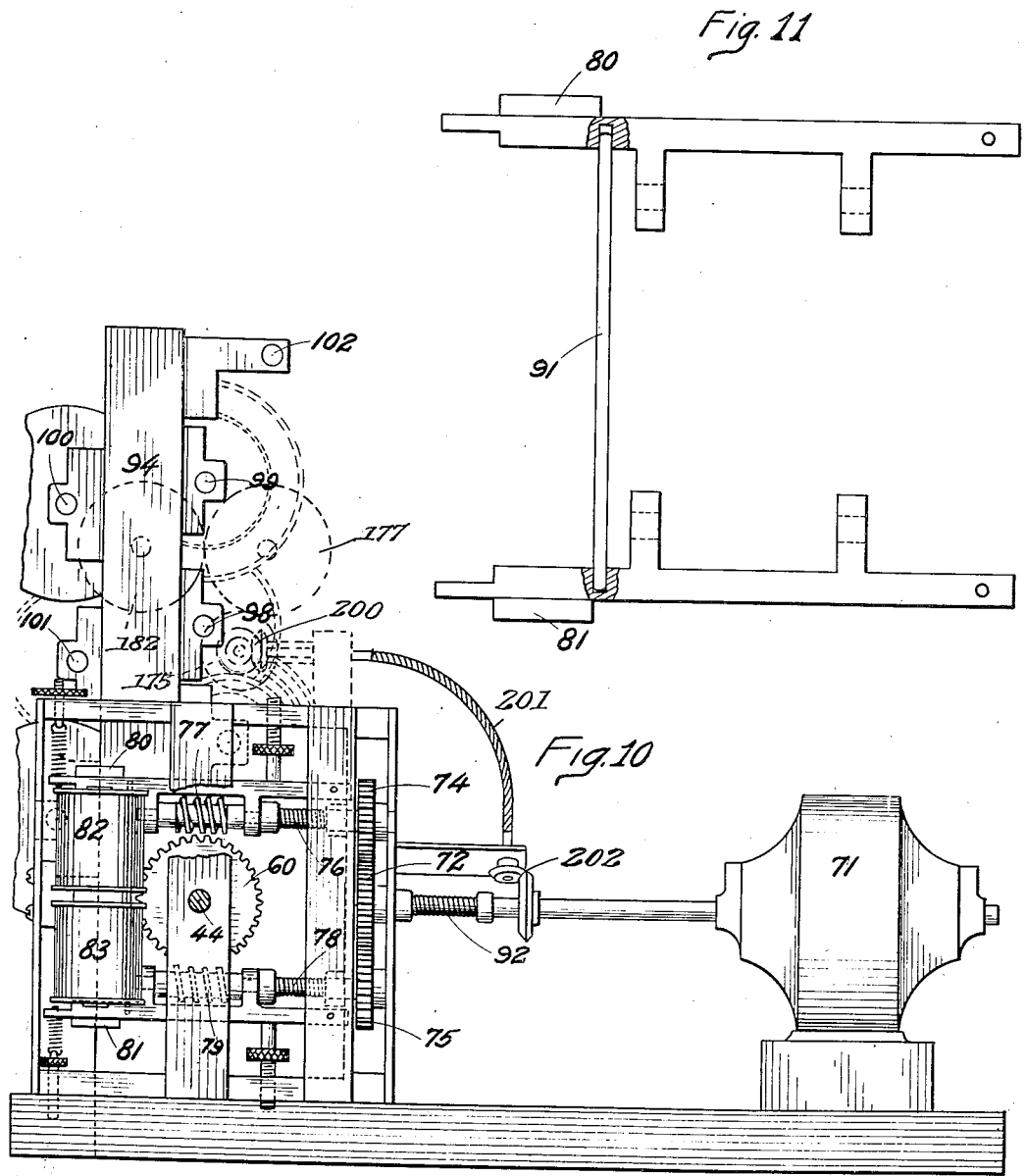

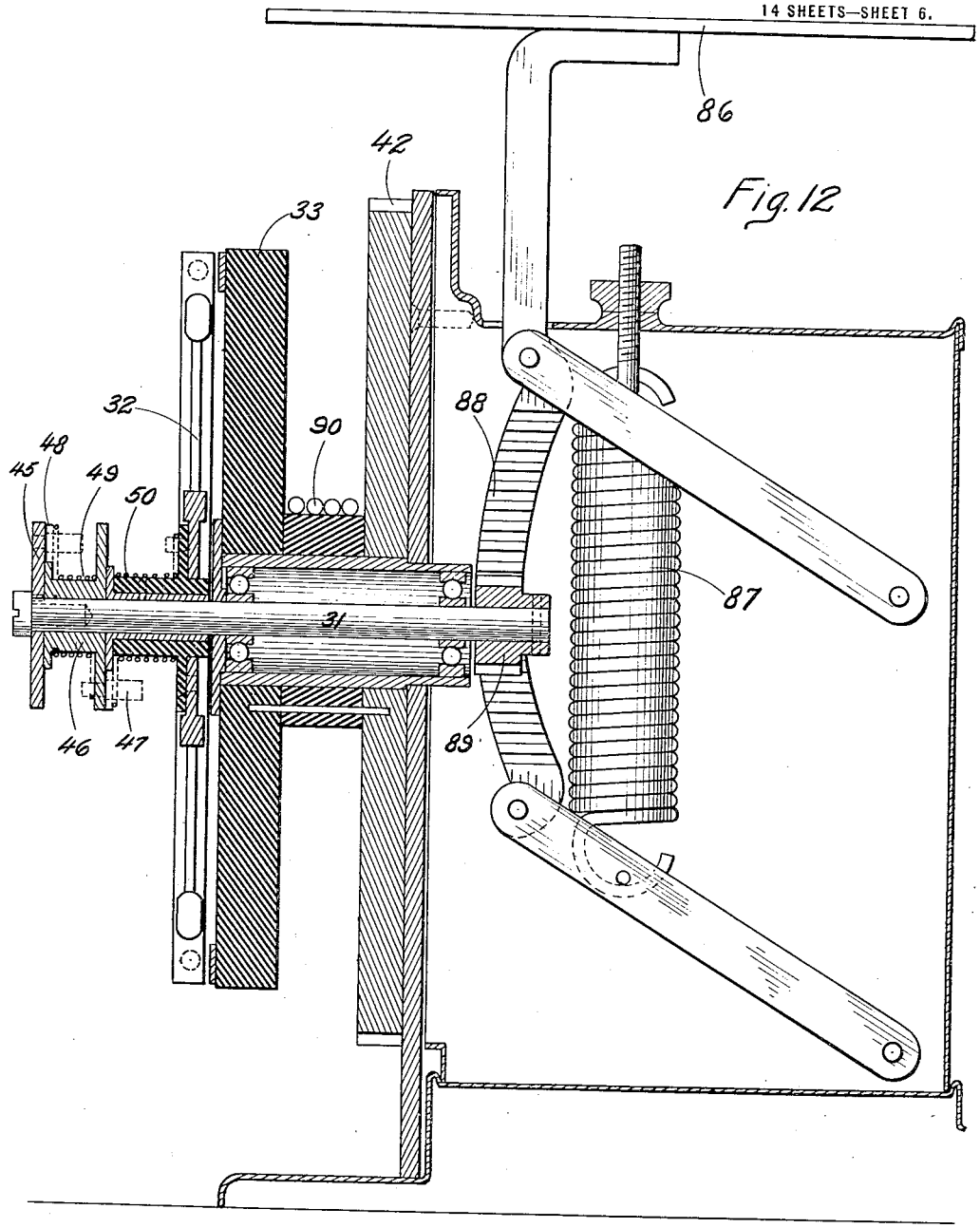

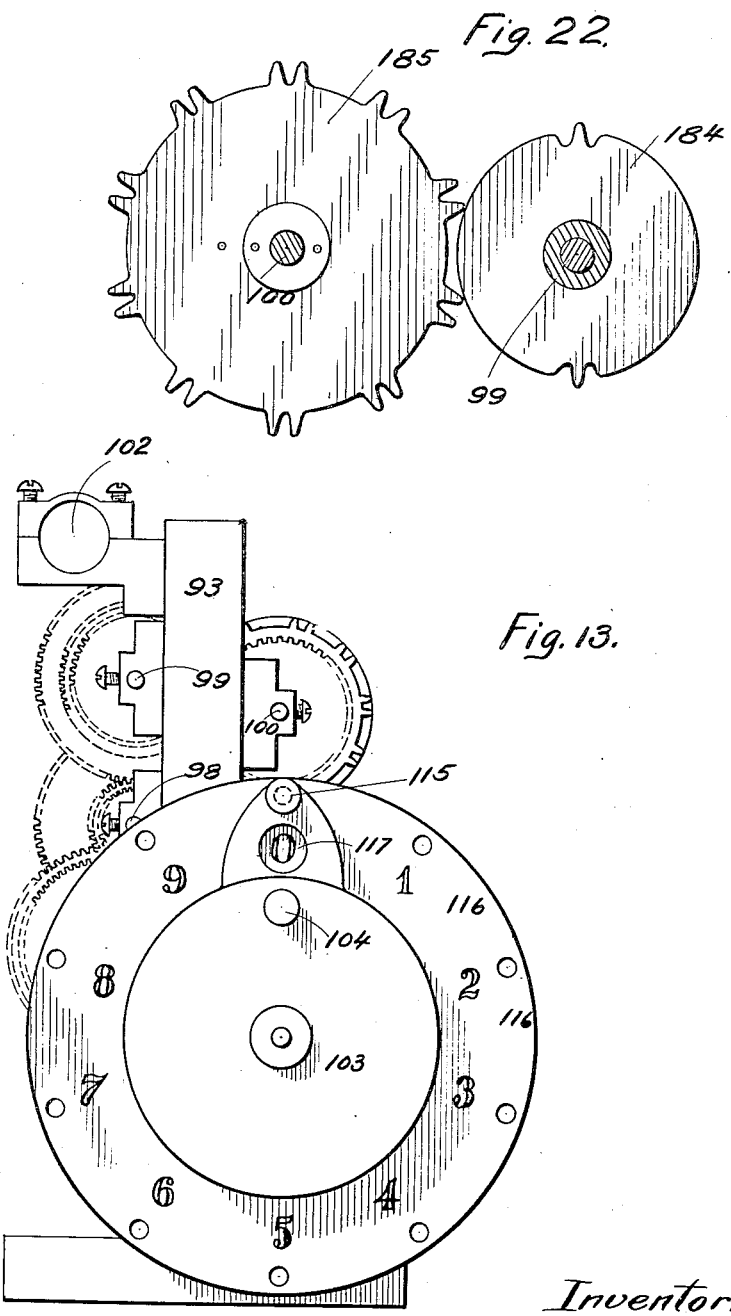

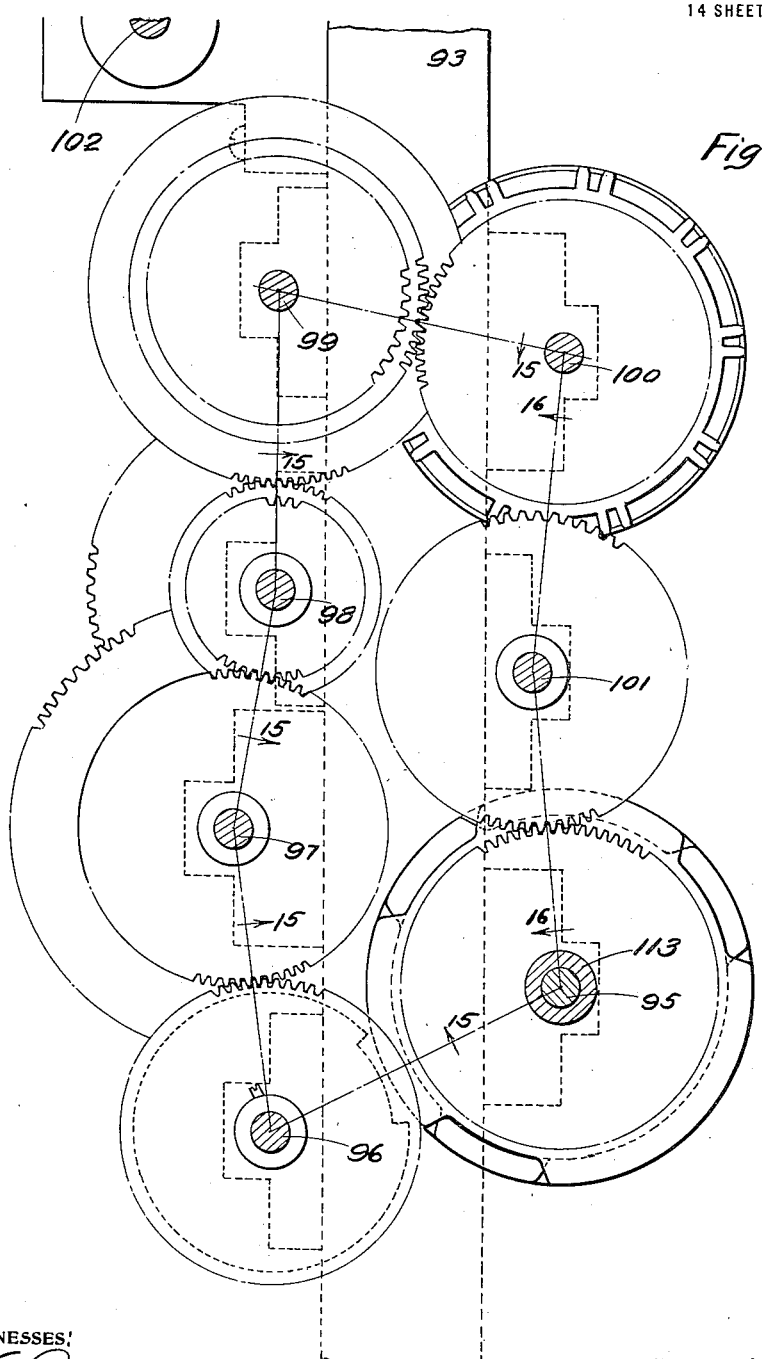

E. M. SCHANTZ.
COMPUTING SCALE.
APPLICATION FILED MAY 8, 1912.

1,273,414.

Patented July 23, 1918.
14 SHEETS—SHEET 9.

Witnesses:
C. C. Burnap
M. F. Kilroy

Inventor:
Edwin M. Schantz
By
Sheridan, Wilkinson, Scott & Richmond Att'ys

E. M. SCHANTZ.
COMPUTING SCALE.
APPLICATION FILED MAY 8, 1912.

1,273,414.

Patented July 23, 1918.
14 SHEETS—SHEET 10.

Witnesses:
C. C. Burnap
M. T. Kilroy

Inventor:
Edwin M. Schantz
By Sheridan, Wilkinson, Scott & Richmond Att'ys

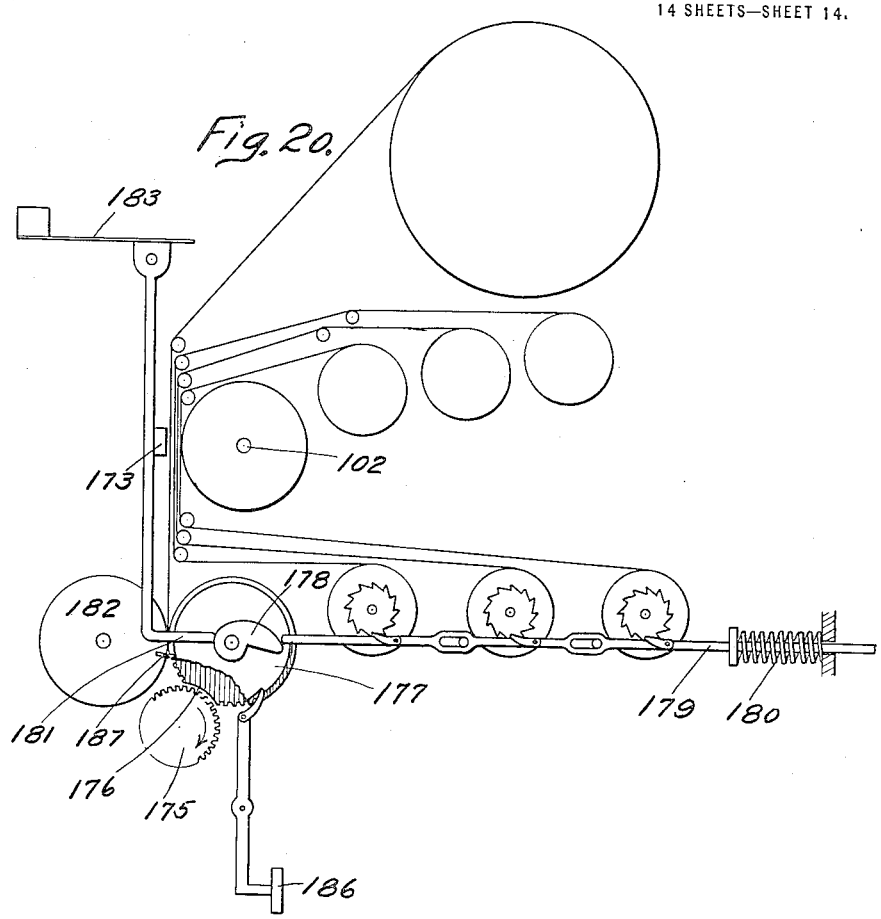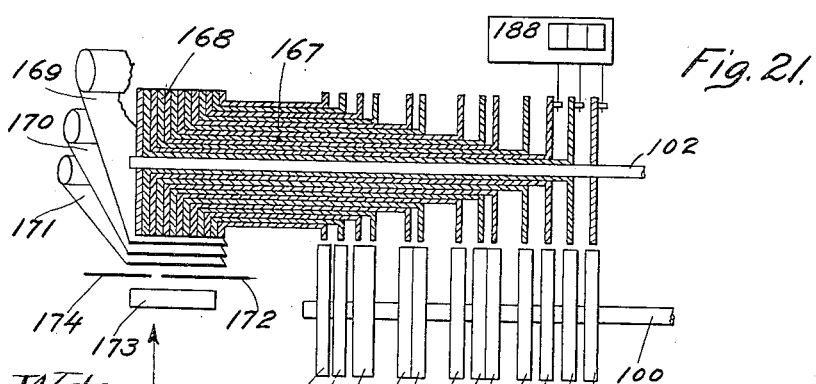

UNITED STATES PATENT OFFICE.

EDWIN M. SCHANTZ, OF CHICAGO, ILLINOIS, ASSIGNOR TO THE COMPUTING SCALE COMPANY, OF DAYTON, OHIO, A CORPORATION OF OHIO.

COMPUTING-SCALE.

1,273,414.      Specification of Letters Patent.      Patented July 23, 1918.

Application filed May 8, 1912. Serial No. 695,879.

*To all whom it may concern:*

Be it known that I, EDWIN M. SCHANTZ, a citizen of the United States, residing at Chicago, in the county of Cook and State of Illinois, have invented certain new and useful Improvements in Computing-Scales, of which the following is a specification.

The principal object of my invention is to provide a new and improved computing scale for weighing articles of merchandise. Another object of my invention is to provide a computing scale that shall indicate and register the results obtained thereby. Another object of my invention is to provide a computing apparatus that shall be operated by an auxiliary source of energy in correspondence with the scale, but without burdening the scale. These objects of my invention and many others will be more readily understood and appreciated in connection with the following specification and claims, taken with the accompanying drawings.

In these drawings, I have, for the sake of making a clear explanation, shown several specific embodiments of my invention, but it will be understood that the invention is intended to be defined in the appended claims.

Referring to the drawings—

Fig. 5 is a general top plan view of the apparatus illustrated diagrammatically in Fig. 1.

Fig. 6 is a detached portion of the same.

Fig. 7 is a front elevation of the weighing apparatus.

Fig. 8 is a top plan view of a locking mechanism and electric switch.

Fig. 9 is an elevation of the same.

Fig. 10 is an elevation of the parts behind those shown in Fig. 7 and looking in the same direction.

Fig. 11 is an elevation of a detail part of the apparatus shown in Fig. 10.

Fig. 12 is a vertical axial section of the weighing apparatus shown in front elevation in Fig. 7.

Fig. 13 is a rear elevation of the computing apparatus.

Fig. 14 is a vertical section of the same, taken on the line 14 in Fig. 15, looking in the direction of the arrows.

Fig. 20 is a diagrammatic elevation of a recording attachment.

Fig. 21 is a diagrammatic section of the same.

Fig. 22 is a detail elevation showing a feature of construction of certain carrying mechanism.

In a general way, the apparatus in Figs. 1 and 5 to 19, inclusive, comprises a spring balance for weighing an article, a computing apparatus with means for indicating and registering the results attained therewith, and means actuated by an auxiliary source of energy to drive the computing apparatus in correspondence with the weighing apparatus. Stated otherwise, the device comprises weighing apparatus and independently energized computing apparatus, the weighing apparatus acting as a pilot for the computing apparatus.

Figure 1:
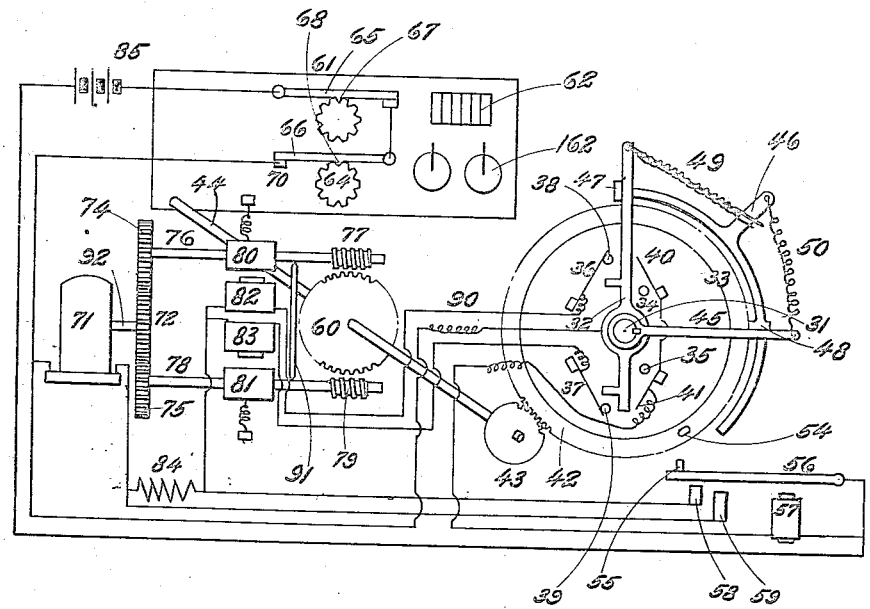
Figure 1 is a general diagrammatic view of one embodiment of my invention.

I shall first describe the apparatus more particularly with reference to Fig. 1, and in this connection it should be understood that details of construction may be learned by referring to Figs. 5 to 19 inclusive.

The article to be weighed is placed on the scale platform 86 (Figs. 5, 7 and 12) and it thereby tends to rotate the shaft 31 through an angle proportional to the weight; this is due to the engagement of the rack 88 with the gear 89 on said shaft 31. The elongation of the spring 87 balances the weight on the platform 86.

The shaft 31 indirectly carries a cross arm 32 in front of an insulating disk 33, which is loosely mounted on the shaft 31.

The insulating disk 33 has studs 34 and 35 that limit the relative angular movement of the cross arm 32. The insulating disk 33 also carries four leaf spring electrical contact terminals 36, 37, 40 and 41. Stops 38 and 39 are provided for the contact terminals 36 and 37, respectively.

Back of the insulating disk 33 and rigidly connected therewith is a large gear wheel 42 which meshes with the small gear pinion 43 keyed on the shaft 44.

For the sake of clearness in the diagram of Fig. 1, the elements designated 45 to 50, inclusive, which I am about to describe, are shown somewhat differently from the actual structure; the latter will be seen most clearly in Fig. 12 and its effect or function is equivalent to that of the structure shown in the diagram of Fig. 1.

Continuing to have reference to Fig. 1, the arm 45, carried by the shaft 31, is connected by a tension spring 50 to the member 46 from which a compression spring 49 extends to the cross arm 32. The abutments 47 and 48 on the member 46 act against the respective arms 32 and 45.

It will be seen that when the shaft 31 rotates clockwise, for example, it will rotate the arm 45 therewith, pulling on the spring 50. This pull on the spring 50 will be transmitted by the abutment 47 to the cross arm 32 and will pull the latter against the stud 34, which is carried by the connected disk 33 and gear wheel 42. Thus, the clockwise rotation of the shaft 31 will tend to rotate the gear wheel 42 therewith, but if the gear wheel 42 is held back, the spring 50 will elongate and permit the arm 45 to go ahead. It will also be seen that if the arm 45 should swing counter-clockwise, it will push the abutment 48 and, through the spring 49, this push will be yieldingly transmitted to the cross arm 32.

The apparatus whose elements are designated by the reference numerals 45 to 50 is not absolutely necessary, but may be provided to protect the mechanism in case heavy articles are weighed.

The gear 42 has a slot 54 normally engaged by the stud 55 on the end of the pivoted arm 56. The magnet 57 attracts the arm 56, causing it to come successively in contact with the two contact terminals 58 and 59.

The shaft 44 carries a worm wheel 60 adapted to be engaged by either of two worms 77 and 79. The shaft 44 also extends into the computing apparatus designated generally in Fig. 1 as 61, and more fully illustrated in Figs. 13 to 19 of the drawings. The reference numeral 62 designates the indicating elements of the computing mechanism 61, and 162 is the manually operated mechanism by which the price is set up, as will be described later.

This computing mechanism 61 comprises two circuit interrupters which are shown diagrammatically in Fig. 1, in order to complete the electric circuits in that figure. 63 and 64 are notched disks which are carried on projecting ends of shaft 95 and sleeve 113 (see Fig. 14) of the computer to be hereafter described. 65 and 66 are respective levers resting thereon with lugs 67 and 68 entering the notches. Thus whenever either disk 63 or 64 is rotated to a position where the corresponding lugs 67 or 68 does not register with a notch in the disk, then the lever 65 or 66 will be raised and the circuit of the battery 85 will be broken either at 69 or 70.

71 is a small electric motor whose flexible armature shaft 92 carries the gear wheel 72 engaging the gear wheels 74 and 75 on the respective shafts 76 and 78 that carry the previously named worms 77 and 79. The two magnets 82 and 83 act respectively on the armatures 80 and 81 associated with the respective shafts 76 and 78. The shafts 76 and 78 are held apart by a strut 91 which prevents both worms 77 and 79 from engaging the worm wheel 60 at the same time.

A resistance 84 is inserted as indicated. The circuits from the battery 85 are shown clearly in Fig. 1, and will be traced in connection with the following description of the operation of the apparatus. At 90 the conductors wind on a drum behind disk 33 so as to afford the necessary flexible connections.

When an article is to be weighed it is placed on the platform 86 (Figs. 6, 7 and 12) and thereby rotates or tends to rotate the shaft 31 through an angle proportional to the weight. The contact terminals 36 and 37 are placed very close to the cross arm 32, so close that in normal condition the separation corresponds to only a small fraction of an ounce. When the shaft 31 rotates under the influence of the weight of the article being weighed, it acts through the spring 50 and throws the cross arm 32 against the stop 34, thus tending to drag the gear wheel 42 in the same direction. The cross arm 32 makes electrical contacts with the leaf springs 37 and 40 and closes the circuit traced as follows (assuming the contacts 69 and 70 to be closed as is normally the case): from battery 85 through magnet 57, contact 40, arm 32, contact 70, lever 66, contact 69, and lever 65, back to battery 85. The consequent energization of the magnet 57 attracts the lever 56 and draws the stop 55 out of the slot 54. The moment the lever 56 strikes the contact terminal 58 another circuit is closed, as follows: from battery 85 through lever 56, contact 58, resistance 84, motor 71, contacts 70, 69 and back to battery 85. This starts the motor 71 at reduced speed, rotating the worms 77 and 79, but normally these worms are not in engagement with the worm wheel 60. When the lever 56 has moved farther and strikes the contact 59, this simply shunts the resistance 84 in the circuit last traced.

The contact closure at 32, 37 completes the circuit traced as follows: from battery 85 through lever 56, contact 58, magnet 83, contact 37, cross arm 32, contacts 70, 69 and back to the battery 85. The consequent energization of the magnet 83 causes the worm 79 to engage the worm wheel 60, thus the motor 71 through the gearing shown causes the gear wheel 42 to follow the arm 45. This continues until the gear wheel 42 overtakes the arm 45, whereupon the contact 32, 40 breaks and then a moment later the contact 32, 37 breaks. The breaking of the contact 32, 40 deënergizes the magnet 57 and permits the stud 55 to rest against the smooth face of the gear wheel 42 (the slot 54 being displaced at this time). When the stud 55 rests against the face of the gear wheel 42, the lever 56 breaks contact with 59, but continues to make contact with 58, thus the motor 71 continues to receive current through the resistance 84, and hence runs at reduced speed. When the contact breaks at 32, 37 the magnet 83 is deënergized and the worm 79 disengaged from the worm wheel 60, thus stopping the rotation of the shaft 44 and the gear wheel 42.

If the arm 45 overshoots and swings back, as is commonly the case with the pointer of a spring balance, then after breaking the contacts 32, 40 and 32, 37, it will next push through the abutment 48 and spring 49 on arm 32 and make the contact 32, 36 and perhaps thereafter also make the contact 32, 41. Making the contact 32, 36 will complete a circuit similar to that previously traced, but through the magnet 82 instead of 83. This will cause the worm 77 to engage the worm wheel 60 and rotate the gear 42 in the opposite direction. If the contact 32, 41 is made, then the magnet 57 will be energized, the contact 56, 59 will be closed, and the resistance 84 shunted.

Thus it will be seen that the energy of the motor 71 is applied to cause the gear wheel 42 to follow the pointer 45 as a pilot, and even if the pointer 45 oscillates, the gear wheel 42 will follow and take up the same angular position as the pointer 45 when the latter finally comes to rest.

The angular displacement of the pointers 45 and 32 being proportional to the weight of the article weighed, it follows that the angular rotation of the shaft 44 is likewise proportional to the weight. This shaft 44 extends into the computing mechanism 61, shown in Figs. 13 to 19, where it is continuous with the shaft designated 96.

The computer frame comprises two end standards 93 and 94 in which are journaled the shafts 95, 96, 97, 98, 99, 100, 101 and 102. Of these, as already mentioned, the shaft 96 is in alinement with and driven by the shaft 44. Keyed on the end of the shaft 95 is a disk 103 with a handle 104. On the part of the shaft 95 remote from the disk 103 there are mounted eight notched disks 105, 106, 107, 108, 109, 110, 111 and 112 which function in pairs as just named, and as will be described presently. These eight disks are shown in elevation in Fig. 19, where they all correspond in angular position. Considering, for example, the pair 105 and 106, it will be seen that the notches 146 on the disk 105 register with the projections 147 on the disk 106, and reciprocally the projections 148 on the disk 105 register with the notches 149 on the disk 106.

Between the disk 103 and the disk 112, both of which are fixed upon the shaft 95, there is a sleeve 113 surrounding said shaft 95. At its end this sleeve 113 carries a disk 114 adjacent to the disk 103. The disk 114 has a handle 115, and through the projection carrying said handle is a sight opening 117 through which numerals are displayed on the stationary disk 116. The handle 115 has a spring actuated dog 150 which engages pits adjacent to the indicating numerals on the stationary disk 116. The handle 104 also has a similar dog 151 which engages pits on the disk 114.

The sleeve 113 carries a set of notched disks exactly similar to those carried by the shaft 95.

The shaft 96 has fixed thereon eight collars 118, each of which carries two loose beveled gears 119 on radial axes. Four of these collars 118 and the respectively associated mechanisms coöperate with the eight disks 105 to 112, inclusive, on the shaft 95 and the other four collars 118 on the shaft 96 with their respectively associated sets of mechanism coöperate with the eight notched disks on the sleeve 113.

Figure 19:
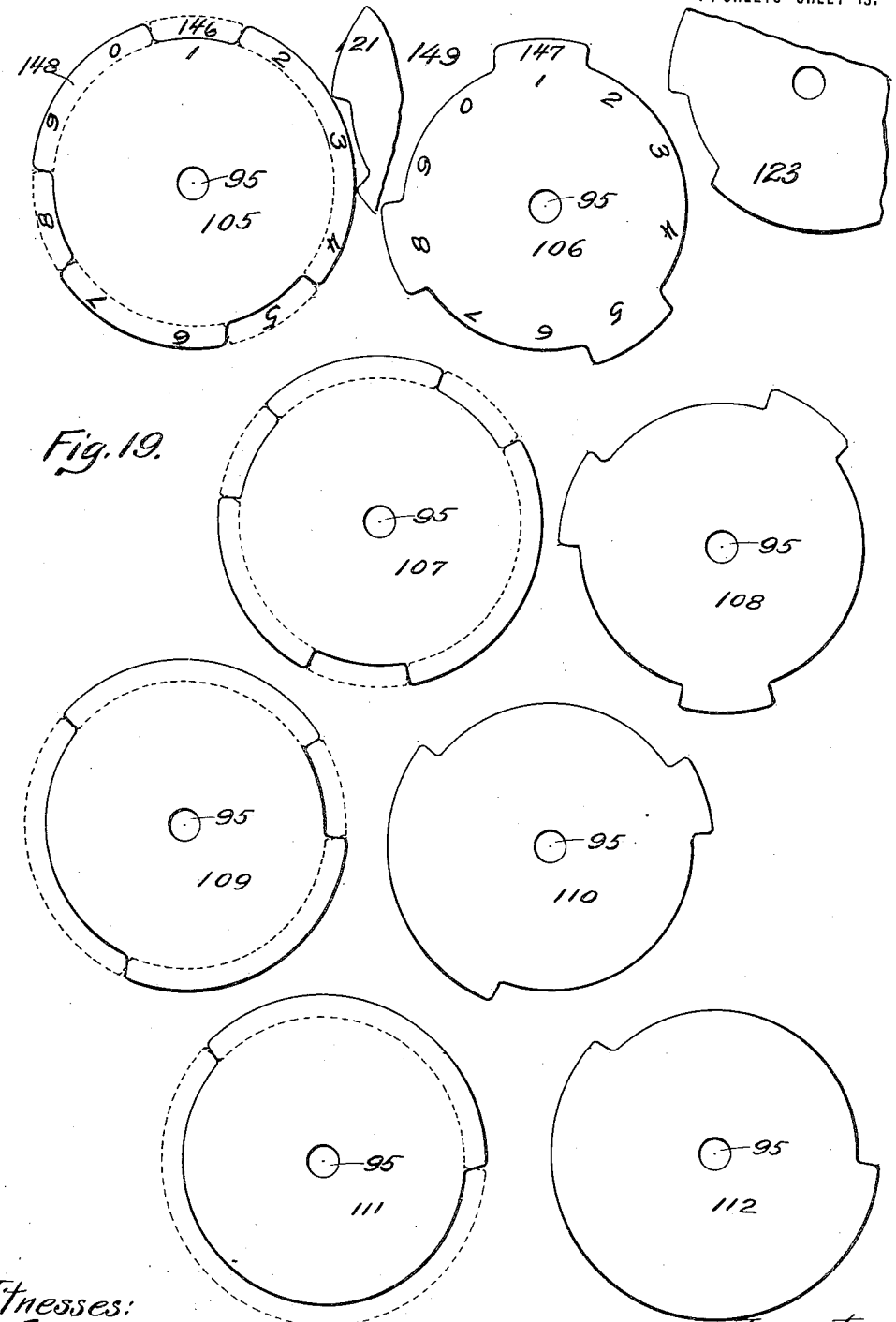
Fig. 19 is a set of elevations of a series of notched disks that are mounted on the lowermost shaft shown in Fig. 15.

Loosely mounted on the shaft 96 beside each collar 118 are two beveled gear wheels 120 and 122 both engaging the pinions 119 and each rigidly connected to a notched disk 121 and 123, respectively. These notched disks 121 and 123 are all alike, each having a single notch, as shown in Fig. 19. The rigidly connected bevel gear wheel 122 and notched disk 123 also have rigidly connected therewith a gear wheel 124 which meshes with the gear wheel 128 loosely mounted on the shaft 97. The gear wheel 128 carries therewith a bevel gear 129. Loosely mounted on the shaft 97 is a sleeve 125 carrying a collar 126 with two loose bevel gears 127 on radial axes. Loosely surrounding the sleeve 125 is a collar comprising the bevel gear wheel 131 opposed to 129, and the gear wheel 130.

Each of the eight sets of differential gear mechanism on the shaft 96 drives from its gear wheel 124 into a gear wheel 128 (130) on the shaft 97. Thus there are eight driven gear wheels 128 (or 130) on the shaft 97. These drive in pairs into the sleeves 125 carrying the respective gears 152, of which accordingly there are four. These four gears 152 on the shaft 97 drive into four gear wheels on the shaft 98 which combine their movement into two trains of gears (the driving wheel of each train being designated, respectively, 132 and 133) from the shaft 98 to the shaft 99. By another similar combination of the motions the two rotations on the shaft 99 are combined into one rotation of the gear wheel 134 on that shaft. This rotation is transmitted to the gear wheel 135 on the shaft 100. Rigidly connected with the gear wheel 135 is the indicating drum 136, which carries numerals from 1 to 10 on its periphery. By means of carrying mechanism one rotation of the drum 136 (which reads cents) moves the drum 153 along one step, this drum indicating tens of cents. Similarly, by further carrying mechanism, the drum 154 is made to indicate dollars. The wheel 184 turns with the gear wheel 134 and engages the wheel 185, which is mounted integrally with the drum 153. The gear 134 is twice as large as 135, and accordingly the wheel 184 makes two rotations for one rotation of the drum 136. The wheel 184 has two teeth which accordingly advance the drum 153 two steps of one-tenth revolution each for each revolution of 184. The carrying from 153 to 154 is effected similarly.

The shaft 95, in addition to its notched disks or cams, carries a gear wheel 137, which meshes with a gear wheel 138 on the shaft 101. This, in turn, drives a gear wheel 139 on the same shaft, which meshes with a gear 140 on the shaft 100. Carried by the gear 140 is the indicating drum 141. Adjacent thereto is another indicating drum 142, which is driven by a similar train of gearing from a gear wheel carried by the sleeve 113. Thus, the two drums 141 and 142 are positively connected by gearing to the two crank handles 104 and 115. These crank handles are used to register the price of the commodity being weighed, and therefore the drums 141 and 142 indicate that price.

Figure 17:
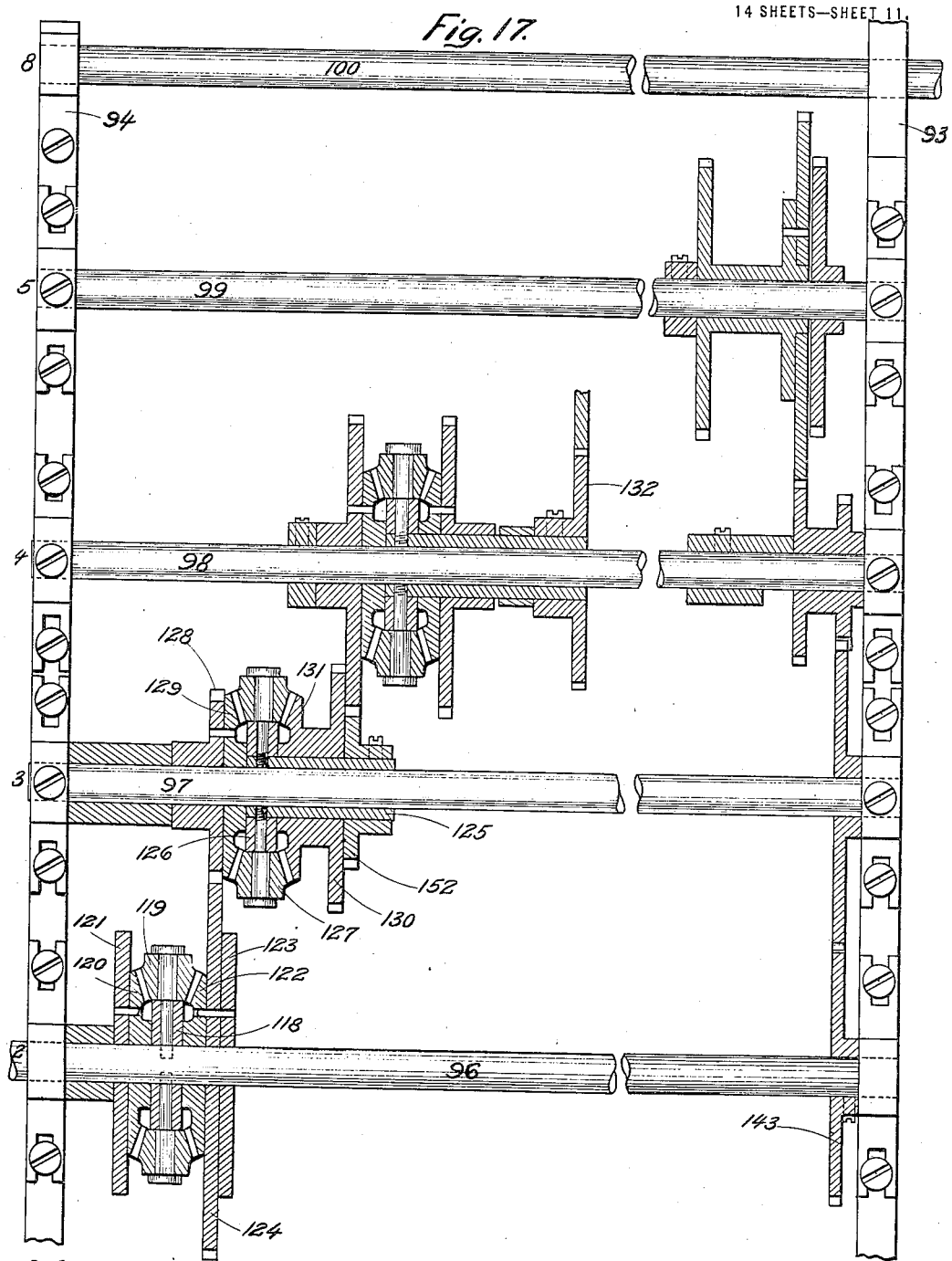
Fig. 17 is a fragmentary section, taken on the line 15 in Fig. 14, looking in the direction of the arrows.
Figure 18:
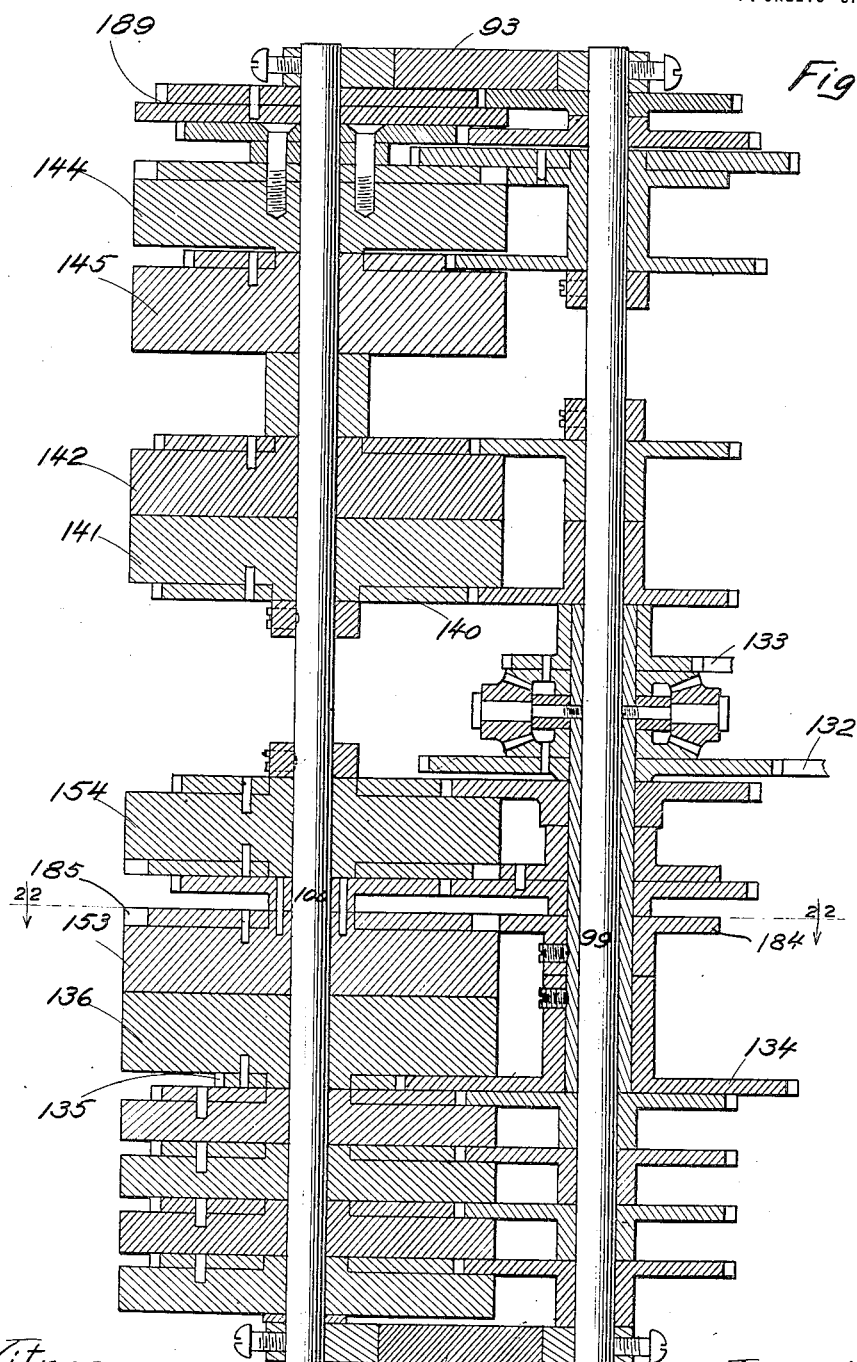
Fig. 18 is an enlarged fragmentary section, taken on the line 15 in Fig. 14, looking in the direction of the arrows.

On the shaft 96 is a gear wheel 143, and from this a train of gears—shown in Fig. 17—drives the drum 144, which indicates ounces of weight, its periphery reading from 1 to 16. By carrying mechanism the adjacent drum 145 is made to indicate pounds of weight.

The computer drive shaft 96 rotates through an angular distance that is proportional to the weight of the article on the scale platform 86, as has already been explained. The price of the commodity is "set up" by means of the handles 104 and 115, that is, for example, for a price of twenty-eight cents per pound the handle 115 would be rotated to stand opposite the numeral 2 on the dial shown in Fig. 13, and the handle 104 would be rotated to stand opposite the numeral 8 on the same dial. This would rotate the sixteen notched disks on the shaft 95 so as to lock some of the gear wheels on the shaft 96 and unlock others. The gear ratios from these various gears over the trains that lead to the gear wheel 135 are different and accordingly these gear ratios will depend on which gears on the shaft 96 are locked and which are unlocked. Referring to Fig. 19, if 105 locks and 106 unlocks this gives "1"; similarly 108 gives "2"; 110 gives "3"; 112 gives "4"; 106 and 112 both unlocking simultaneously give "5"; similarly 108 and 112 give "6"; 110 and 112 give "7"; 106, 110 and 112 give "8", and 108, 110 and 112 give "9". That is, by locking certain of the gears on the shaft 96 by means of the disk on the shaft 95 and unlocking others in this way ten alternative gear ratios are obtained from the shaft 96 to the gear wheel 135. These ten ratios are respectively proportional to the numbers 0, 1, 2, and so on, to 9. Each of these ratios is in effect determined by the position of the handle 104 with respect to the dial 116. Similarly, the handle 115 gives ten different gear ratios by means of the notched collars on the sleeve 113.

Thus, it will be seen that the three drums 154, 153 and 136 indicate the product in dollars and cents obtained by multiplying the price of the commodity by the number of units of weight thereof.

Also, the two drums 142 and 141 indicate the price of the commodity per unit of weight.

Also, the two drums 144 and 145 indicate the weight of the commodity in pounds and ounces.

The four drums 163, 164, 165 and 166 on the shaft 100 are provided in connection with a recording adjustment which I will now describe, referring particularly to Figs. 20 and 21. These four disks just referred to are intended to be rotated manually by the operator. 163, 164 and 165, respectively, are for cents, dimes and dollars for the customer to pay the cashier, as will be explained presently. Disk 166 is to indicate the class of merchandise sold by the letters A, B, C, &c. Another drum 189 on the same shaft is to indicate the initials or number of the clerk making the sale. Altogether, it will be seen that on the shaft 100 there are twelve indicating drums. On the shaft 102 there are twelve telescoping sleeves 167. At one end each sleeve gears directly or indirectly with a corresponding drum on the shaft 100. This gearing is not shown on the figures, but is indicated diagrammatically in Fig. 21. At the other end each sleeve 167 carries a type wheel 168. In front of the twelve type wheels 168 is a carbon ribbon 169 and adjacent to this in successive order are a permanent record sheet 170, another carbon ribbon 171, and a strip of tickets 172 and a temporary ticket 174 side by side. The hammer 173 is adapted to strike in the direction of the arrow shown in Fig. 21 and print from the type wheels 168. The gear wheel 175 is driven from the motor 71 by connections comprising bevel gears 200, flexible shaft 201 and bevel gears 202 (see Fig. 10). When the clerk wishes to record a sale he pushes on the key 186 and thereby starts the gear 177 to rotate counter-clockwise. This gear 177 is notched at 176 so that only by the push just referred to can the gear 175 engage the gear 177, but thereafter 177 will make a complete revolution. This gear 177 carries a cam 178 which pushes the bar 179 against the spring 180. This spring 180 returns the bar so that the pawls carried thereby rotate the winding drums for the ribbon 169, record sheet 170 and ribbon 171. The strip of tickets 172 is fed forward between a drum carried by the gear 177 and an opposed drum 182. This drum 182 and its opposite drum carry a respective knife and notch, as indicated by 187, that cut off the ticket. The hammer 173 is carried by a lever 181 which is acted upon by the cam 178. The spring 183 causes the hammer 173 to strike a smart blow to cause the printing impression to be taken.

After the drums on the shaft 100 that indicate price, weight and computed cost have automatically come to rest, the clerk moves the drums 163, 164 and 165 to indicate how much a customer shall pay. He also moves the drum 166 to indicate the class of goods, and the drum 189 to record his identity, and then pushes the button 186. This causes a permanent record to be made upon the sheet 170 of all the data referred to. It also causes a record of the price per pound, number of pounds and ounces, computed cost, and salesman's initials, to be made on the ticket 172. There is no duplicate record made as to the class of goods from the disk 166. The duplicate record of the amount charged the customer is made on the ticket 174. It is intended that the ticket 172 shall be wrapped with the goods while the ticket 174 shall be handed by the customer to the cashier, to indicate the amount due from the customer.

One reason for registering both the computed cost of the goods and the amount to be charged to the customer is shown by this illustration. In certain classes of goods, such as cheese, the customer may ask for, say, twenty-five cents worth and the nearest the clerk can come to cutting this will be to give him twenty-six cents worth. In this case the record will show the computed cost to be twenty-six cents, but the amount to be paid the cashier is twenty-five cents.

With the apparatus that I have described, a customer can carry a ticket 174 from one clerk to another and each clerk can register thereon the amount that he charges the customer for the goods sold by him to the customer, then the customer can take the ticket 174 to the cashier, who will add up these amounts and take the payment accordingly.

In this system, when a customer buys some article that is not sold by weight, as, for example, canned goods, the goods are weighed nevertheless, but with the price indicating elements 162 set at zero. In this way a record is made of every purchase.

Attached to the machine there may be a set of permanent registers which will add the indications of the various disks on the shaft 100. One such register is indicated diagrammatically at 188 in Fig. 21. This may be on the principle of the Veeder counter, and it will simply add the indications of the corresponding disks on the shaft 100 for rotations in one direction and not be operated by rotations in the other direction. With a set of such registers 188 the proprietor can see at a glance how the total computed costs of articles sold over the scales compare with the amounts charged the customers and can easily gather other information.

Figure 2:
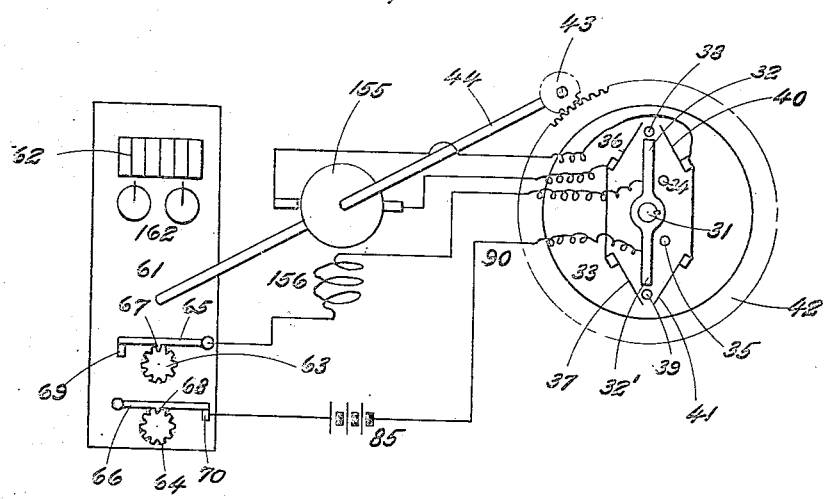
Figs. 2, 3 and 4 are diagrammatic views of modified forms of my invention.
Figure 3:
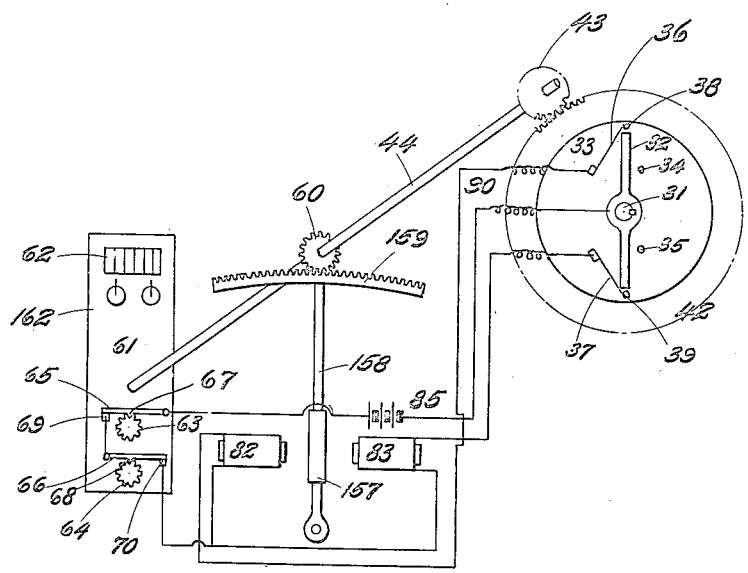
Figure 4:
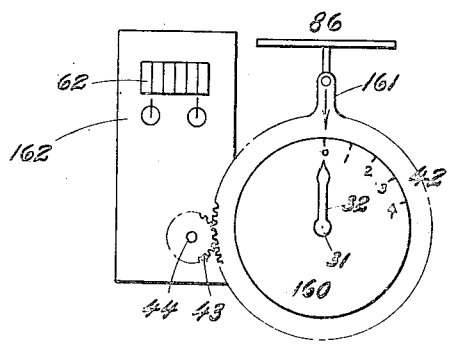
Figure 15:
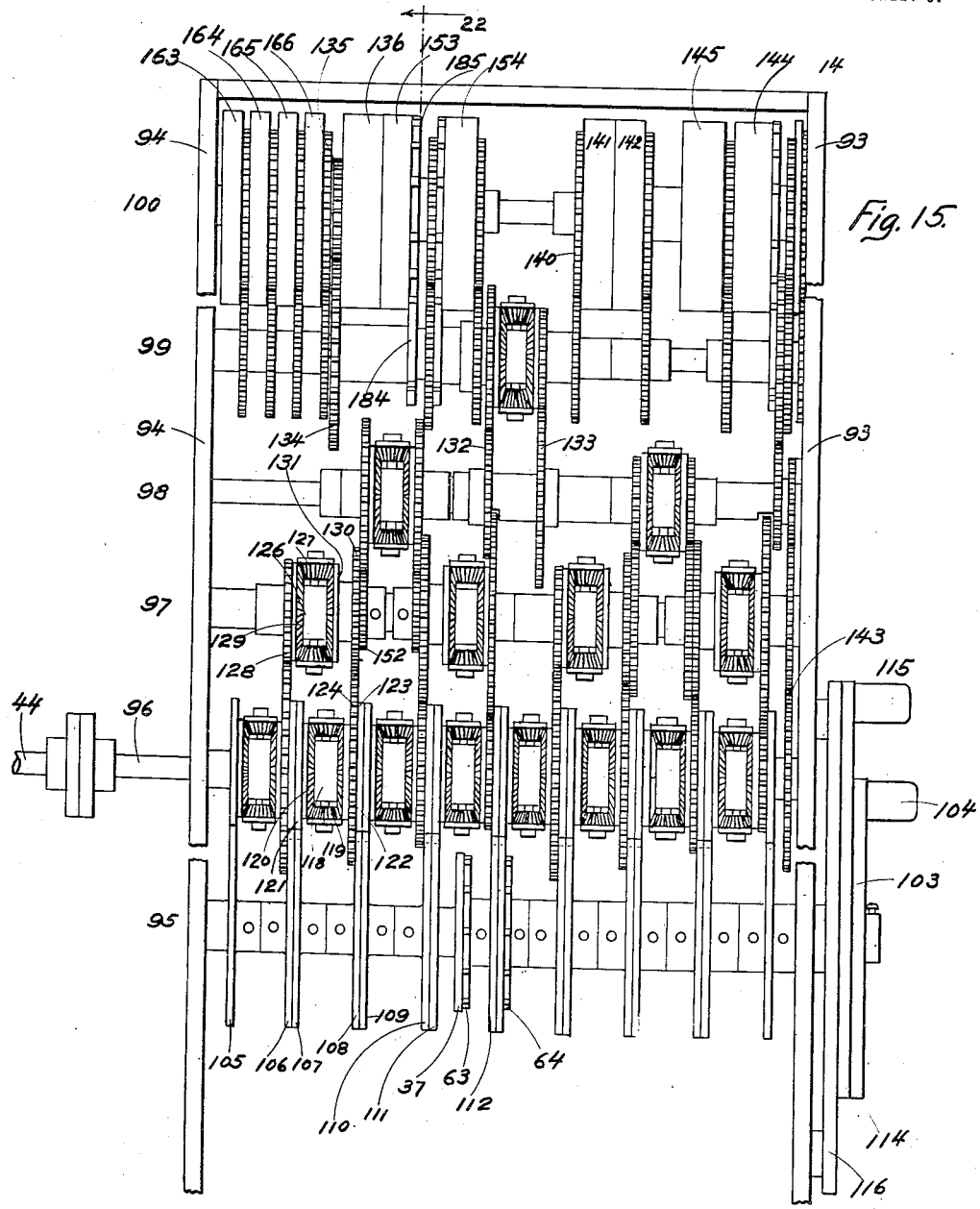
Fig. 15 is a semi-diagrammatic elevation of the computing apparatus looking across the broken line 15 in Fig. 14, in the direction of the arrows.
Figure 16:
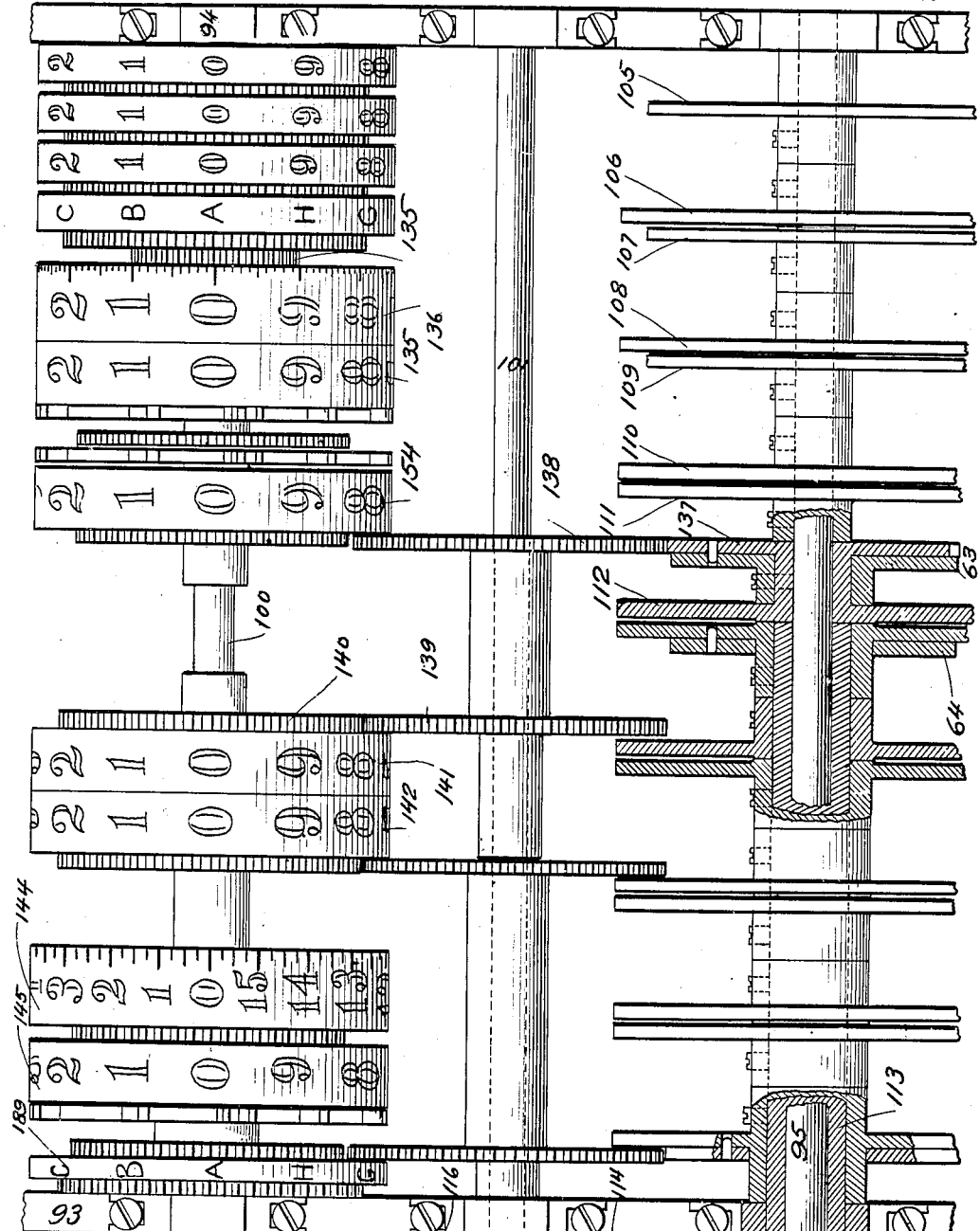
Fig. 16 is a section of the computing apparatus, taken on the broken line 16 in Fig. 14, looking in the direction of the arrows.

Having described the specific embodiment of my invention illustrated in Figs. 1 and 5 to 19 of the drawings, I will now describe the modifications shown in Figs. 2, 3 and 4.

The device shown in Fig. 2 differs from that of Fig. 1 in that the shaft 44 carries the armature 155 of an electric motor whose field magnet is 156. For simplicity, the yielding mechanism corresponding to reference numerals 46 to 50 in Fig. 1 has been omitted from Figs. 2 and 3, but it will readily be understood that it could be supplied. The electric circuits being arranged as shown in the diagram, it will be seen that if the pointer 32 rotates clockwise it will make a contact with the two leaf springs 37 and 40, closing a circuit traced as follows: From battery 85, through arm 32', contact 37, armature 155, contact 40, field 156, contacts 69, 70 and thence back to the battery 85. On the other hand, if the cross arm 32 moves counter-clockwise, it will make electrical contact with the leaf springs 36 and 41, thus closing the circuit from battery 85, through arm 32', contact 41, armature 155, contact 36, field winding 156, contacts 69, 70 and back to the battery 85. It will be observed that the two circuits just traced flow through the armature 55 in reverse direction, thus reversing the motor and making it drive the gear wheel 42 to follow the arm 32, whichever way the latter swings. In connection with the explanation of Fig. 1 the operation of this device will now be apparent.

The device shown in Fig. 3 comprises a pivoted arm 158 with an armature 157 adapted to be acted upon by either of the magnets 82 or 83. The arm 158 carries a geared sector 159 which engages the gear wheel 60. It will readily be seen by tracing the circuits that the movement of the pointer 32 clockwise or counter-clockwise will energize the magnet 83 or 82, respectively, thus shifting the geared sector 159 and causing the gear wheel 42 to follow the index 32.

Referring to Fig. 4, 32 designates the index hand of a scale, such as a spring balance. 160 is a fixed dial on which the said index 32 reads. Behind the fixed dial 160 is the gear wheel 42 rotatably mounted around the shaft 31 that carries the index 32. The gear wheel 42 has a handle 161 by which it may be turned manually. The computer 61 has its price setting elements designated 162.

To illustrate the use of the device shown in Fig. 4, suppose, for example, it is desired to sell three pounds of coffee, the price being thirty-five cents per pound. This price is set up on the device 162 and the handle 161 is swung around until it brings the adjacent arrow head opposite the three pound mark on the dial 160. This causes the indicator 62 to exhibit the data of the sale, including the cost of the three pounds of coffee, which would be $1.05. Then the coffee is loaded on the platform 86 until the index 32 registers with the arrow on the handle 161.

Again, suppose that it is desired to sell a ham of previously unknown weight at twenty-three cents per pound. The price—twenty-three cents—is set up in the device 162 and then the ham is put on the platform 86, throwing the pointer around to indicate, say, eight pounds. Then the operator seizes the handle 161 and rotates it until the arrow thereon registers with the index 32, whereupon the indicator 62 wil exhibit the data of the sale, including the cost of the ham, which will be $1.84.

Suppose, again, that a customer calls for one dollar's worth of sugar, the price of which is six cents per pound. The operator sets this price on the device 162 and then rotates the handle 161 until the indicator 62 shows one dollar as the computed cost. Leaving the computor in this condition, he then loads the sugar upon the goods-receiver 86 until the index 32 registers with the arrow on the handle 161. This assures him that the sugar has been loaded upon the goods-receiver to the extent of one dollar's worth.

In the folowing claims I have referred to one element of the combination which in certain aspects constitutes my invention, as an equilibrium machine. A specific embodiment of this is shown, for example, in Fig. 12, where it comprises the platform 86, rack 88 and spring 87. An equilibrium machine is understood to be a device in which there is a goods-receiver of some sort and an element which takes a position that corresponds with the weight of the article on the goods-receiver.

It will be seen that in a device made according to my invention, the equilibrium machine is not unduly burdened with the work of moving elements of mechanism, but it acts as a sort of a pilot to determine the application of an auxiliary source of energy to move the computing mechanism.

I claim:

1. In a device of the class described, in combination; an equilibrium machine; a computing machine adjustable in accordance with two factors, one the price per pound and the other the weight on the equilibrium machine; an auxiliary source of power; and means to apply the power and to control the application thereof to operate the computing machine in either direction to correspond with the weight on the equilibrium machine and the other factor.

2. In a device of the class described, in combination; an equilibrium machine; a computing machine adjustable in accordance with two factors, one the price per pound and the other the weight on the equilibrium machine; a recording machine positioned in accordance with the computation performed on the computing machine; an auxiliary source of power; and means to apply the power and to control the application thereof to operate the computing machine and the recording machine to correspond with the equilibrium machine.

3. In a device of the class described, in combination; an equilibrium machine; an index operated thereby; a computing machine; a recording machine separate from but operated in accordance with the computation performed on the computing machine; an auxiliary source of power; and means to apply the said power to operate the computing machine to correspond with the equilibrium machine, said means being adapted to limit the operation of the computing and recording machine in accordance with the position of the index operated by the equilibrium machine.

4. In a device of the class described; an equilibrium machine; an index operated thereby; a computing machine; a member mechanically connected thereto and adapted to be placed in registering position with said index; means to adjust the computing machine to correspond with one factor; an auxiliary source of energy; and means operable by the movement of the index to apply said auxiliary source of energy to actuate the computing machine to correspond with another factor, corresponding to the weight on the equilibrium machine and thereby bring said member and index into registering position.

5. In a device of the class described, in combination; an equilibrium machine; a computing machine; means to set up the price of a commodity in the computing machine; means associated with the aforesaid means to control the to be performed computation; an auxiliary source of power; and means operable upon and by the movement of the equilibrium machine from normal position to apply said power to operate the computing machine to correspond with the equilibrium machine.

6. In a device of the class described, in combination; an equilibrium machine which is never locked and always freely movable; an index operated thereby; follow-up devices associated with the aforesaid index; a computing machine in operative relation with the said follow-up devices; an auxiliary source of power to operate the aforesaid follow-up devices and the computing machine; and means for automatically applying said power upon the relative movement of the index and follow-up devices, to move the follow-up devices and the computing machine to an extent proportional to the movement of the index, whereby the computation may be performed without affecting the accuracy of the equilibrium machine.

7. In a device of the class described, an equilibrium machine; a computing machine having means to manually set up the price of a commodity therein and to thereby predetermine the computation to be performed therein; an auxiliary source of power; and means to apply the same to operate said computing machine to correspond with the equilibrium machine and thereby multiply the number of units of weight on the equilibrium machine by the predetermined price per pound set up manually in the machine and obtain the total or computed cost of the commodity weighed on the equilibrium machine the said auxiliary power applying means being operable automatically by the movement of the said equilibrium machine.

8. In a device of the class described, in combination; an equilibrium machine; a movable member carried thereby, whose position corresponds with the weight of an article weighed on the equilibrium machine; a computing machine adjustable in accordance with two factors, one the price per pound of the commodity weighed, and the other the weight on the equilibrium machine, and adapted to multiply the said factors and thereby obtain the product as the computed cost of the article weighed; means for adjusting the said machine in accordance with the price factor; an auxiliary source of power; and means controlled by the movable member for connecting the said machine with the source of power to actuate the machine to correspond with the position of said movable member.

9. In a device of the class described, in combination; an equilibrium machine; a computing machine adjustable in accordance with two factors, one price per pound and the other corresponding to the weight on the equilibrium machine, said machine being adapted to multiply the said factors and exhibit the product as computed cost; a source of electric energy; a driving means for the computing machine; electromagnetic mechanism adapted to couple the computing machine with the said driving means; and control means for the said mechanism carried by the equilibrium machine.

10. In a device of the class described, in combination; an equilibrium machine having an index carried thereby; a computing machine adjustable in accordance with two factors, one the price per pound of the commodity weighed and the other corresponding to the number of units of weight on the equilibrium machine; an electric motor to actuate the computing machine; and control mechanism for said electric motor adapted to be actuated by said index.

11. In a device of the class described, in combination; an equilibrium machine having an index carried thereby; a computing machine having elements adapted to be set to the price of a commodity, and other elements adapted to be set to correspond with the weight of the commodity weighed; a member adjacent the said index mechanically connected with the weight set elements of the computing machine; electric contact devices carried by said member and adapted to be actuated by said index; and a motor to drive said contact elements, said motor drive being controlled by circuits closed and opened by the aforesaid contact devices and the said index.

12. In a device of the class described, in combination; an equilibrium machine, having an index operated thereby; a computing machine with a movable member adjusted to said index, said movable member and said index being adapted to control the movement of the computing machine in accordance with the displacement of the equilibrium machine; a stop to limit the relative movement of the said index and said movable member; and yielding means between the index and the equilibrium machine to permit relative displacement upon the application of excessive force by the equilibrium machine.

13. In a device of the class described, in combination; an equilibrium machine; a computing machine; movable elements connected with said machines respectively; and means operable upon relative movement of the aforesaid movable elements, to apply an auxiliary source of energy to move one of said elements in either direction and bring said one element into position of registry with the other element, whereby the computing machine is positioned in accordance with the displacement of the equilibrium machine.

14. In a device of the class described, an equilibrium machine, a rotatable index actuated thereby, a disk adjacent to said index, electric contact terminals carried by said disk and adapted to be actuated by the relative movement of said index, a computing machine, electromagnetic mechanism to actuate said computing machine and said disk in unison, and circuit connections from said contact members mounted on the disk and extending to said electromagnetic mechanism.

15. In a device of the class described, an equilibrium machine, a rotatable index carried thereby, an insulating disk adjacent thereto mounted to rotate on the same axis, an axial shaft operated by the equilibrium machine, yielding means tending to hold the index and the shaft in fixed angular relation to each other but permitting relative displacement on the application of excessive force, a stop carried by the disk to be engaged by the index, a computing machine mechanically connected to operate in unison with the said wheel, electric contact elements carried by the disk and adapted to be actuated by the said index, and electro-magnetic mechanism controlled by said contacts and adapted to drive the said computing machine and wheel.

16. In a device of the class described, an equilibrium machine, a computing machine, electro-magnetic mechanism to drive said computing machine, control contacts for the circuits thereof actuated by said equilibrium machine, means to adjust the computing machine for any desired price, and means to interrupt the circuit of said electro-magnetic mechanism when any such adjustment is being made.

17. In a device of the class described, in combination; an equilibrium machine; a computing machine; said last named machine being adapted to be set for a predetermined price per pound and to multiply the weight on the equilibrium machine and obtain the computed cost; electromagnetic mechanism to drive the computing machine; and electric contacts therefor controlled by the equilibrium machine.

18. In a device of the class described, in combination; an equilibrium machine; a computing machine, said machine being adapted to be set for a certain price per pound and to multiply that price per pound by the weight on the scale and obtain the computed cost; an auxiliary source of energy; and means to apply the same to drive the computing machine in either of two directions; and control means therefor actuated by the equilibrium machine.

19. In a device of the class described, an equilibrium machine, a computing machine adapted to multiply price per unit of weight by the weight and obtain the computed cost, an electro-magnetic device to drive the computing machine, and a circuit closer for the same controlled by the equilibrium machine, and means to open said circuit closer at no load position of the equilibrium machine and close the same at other positions.

20. In a device of the class described, an equilibrium machine, a computing machine, a motor, means to start said motor in operation whenever the equilibrium machine deviates from its no load position, and means controlled by the equilibrium machine to apply the energy of the motor to drive the computing machine in a direction corresponding to the direction of the deviation of the equilibrium machine.

21. In a device of the class described, an equilibrium machine, a computing machine, an electric motor to drive the computing machine, an index carried by said equilibrium machine, a disk carried by said computing machine, means to close the circuit of the motor through a resistance when the said index moves a limited distance from no-load position, and means to shunt the resistance when the said index moves a certain distance relatively to the said disk.

22. In a device of the class described, an equilibrium machine, a computing machine, means to adjust the computing machine in correspondence with any desired one of a set of prices, auxiliary means to displace an element of the computing machine through a distance proportional to the weight of an article placed on the equilibrium machine, and means to thereby multiply the adjusted price by the said weight and exhibit the product.

23. In a device of the class described, in combination; an equilibrium machine; a computing machine; means to apply an auxiliary source of power to operate the computing machine in accordance with the displacement of the equilibrium machine; and means for preventing the operation of the computing machine by the auxiliary source of power until the equilibrium machine moves from no load position of equilibrium.

24. In a device of the class described, in combination; an equilibrium machine; a computing machine; means to set up the price per pound in said computing machine; means for applying an auxiliary source of power to operate the computing machine in accordance with the displacement of the equilibrium machine; and means to prevent the application of said power when the price per pound is being set up in the computing machine.

25. In a device of the class described, an equilibrium machine, a member actuated thereby so as to take different positions corresponding to different loads thereon, a computing machine, means to adjust the computing machine for various prices per unit of weight in such a load, a recording machine driven by the computing machine, a member operatively connected with the computing machine and adapted to take different positions corresponding with the positions of said first mentioned member, said computing machine being adapted to compute the product of the adjusted price per unit weight by the number of units weight corresponding to any such said position, and means to apply an auxiliary source of power to move and to limit the movement of the member associated with the computing machine to a position corresponding with that of the other said member and at the same time to perform the computation indicated and operate the recording machine.

26. In a device of the class described, in combination; an equilibrium machine; a computing machine; means to set up the price per pound in said computing machine; means for applying an auxiliary source of power to operate the computing machine in accordance with the displacement of the equilibrium machine; means to prevent the application of said power, when the price per pound is being set up in the computing machine; and means to prevent the operation until a load is placed upon the equilibrium machine.

27. In a device of the class described, an equilibrium machine, an index actuated thereby, a computing machine, means to record results computed by the latter machine, means to adjust the computing machine in accordance with any desired price per unit of weight, said adjustment being adapted to control the computation performed by the computing machine, and means to apply an auxiliary source of power, independent of the power of the equilibrium machine, to actuate the computing machine to correspond with said index and to thereby perform the computation and obtain the computed cost of the commodity weighed.

28. In a device of the class described, an equilibrium machine, a computing machine, a shaft adapted to be rotated by the equilibrium machine through an angular distance proportional to the load on the equilibrium machine, an index carried by said shaft, a member adapted to rotate about said shaft adjacent to said index, said member being operatively connected to said computing machine, electric circuit closers carried by said member and adapted to be actuated by said index, and electromagnetic means controlled by said circuit closers to drive the computing machine.

29. In combination, an equilibrium machine, an index carried thereby, a member adapted to register in position with said index, recording means, gearing between said member and said recording means, means to adjust the effective resultant gear ratio of said gearing in accordance with any desired price per unit of weight, and means to apply an auxiliary source of power to drive said member to take up its registering position and at the same time drive the said gearing and actuate the recording means.

30. In combination, an equilibrium machine, an index carried thereby, a shaft carrying a plurality of differential gear mechanisms, a countershaft, one of the two sides of each said mechanism being geared to said counter-shaft, means to lock either side and unlock the other side of each such mechanism and thereby transmit the rotation of the shaft or not as desired, a recording apparatus driven from said countershaft, and means to apply an auxiliary source of power to rotate the first mentioned shaft to correspond with said index.

31. In combination, an equilibrium machine, an index carried thereby, a shaft carrying a plurality of differential gear mechanisms, a countershaft, one of the two sides of each said mechanism being geared to said countershaft, means to lock either side and unlock the other side of each such mechanism and thereby transmit the rotation of the shaft or not as desired, additional differential gear mechanisms on said countershaft to receive and transmit rotation from said first mentioned shaft, a recording apparatus driven from said additional differential gear mechanisms, and means to apply an auxiliary source of power to rotate the first mentioned shaft to correspond with said index.

32. In combination, an equilibrium machine, an index carried thereby, a shaft carrying a plurality of differential gear mechanisms, a countershaft, one of the two sides of each said mechanism being geared to said countershaft, a cam shaft beside said first mentioned shaft, cams on the cam shaft in pairs, said cams being adapted in certain angular positions to lock one side or the other side of each differential gear mechanism and thereby transmit the rotation of the first mentioned shaft or not as desired, a recording apparatus driven from said countershaft, and means to apply an auxiliary source of power to rotate the first mentioned shaft to correspond with said index.

33. In a device of the class described, in combination, an equilibrium machine, means controlled by said machine to indicate and record the weight of the commodity weighed on said machine, manually controlled means to indicate and record the price per unit of weight, means controlled by the equilibrium machine and said manually controlled means to indicate and record the computed cost of the commodity weighed on the said machine, manually controlled means to indicate the amount to be charged for said goods and means to record the same simultaneously with the recording of the computed cost.

34. In a device of the class described, in combination, an equilibrium machine which is never locked and always freely movable, a computing machine, means to set up the price of a commodity in the computing machine, means associated with the aforesaid means to control the to be performed computation, a driving means for the computing machine independent of the equilibrium machine and means to control the extent of movement of the computing machine under the influence of said driving means in accordance with the position of the index operated by the equilibrium machine.

35. In a device of the class described, in combination, an equilibrum machine; a computing machine adjustable in accordance with two factors, one the price per pound and the other the weight on the equilibrium machine; a recording machine positioned in accordance with the computation performed on the computing machine; means, independent of motive power of the equilibrium machine, for driving the computing machine in accordance with the said factors; and means for controlling said computing machine driving means in accordance with the displacement of the equilibrium machine.

36. In a computing scale, in combination, an equilibrium machine, adapted to take varying positions in accordance with the load thereon, a computing multiplying device adapted of itself to multiply price per pound and weight and obtain computed cost, means for setting said computing multiplying device in accordance with price per pound, means operable by a source of power independent of the motive power of the equilibrium machine for actuating the computing device to an extent proportional to the varying position of the equilibrium machine to affect the said multiplication, means controlled by the equilibrium machine for controlling the extent of such actuation, and means for taking a printed record of computed cost from the said multiplying device.

37. In a computing scale, in combination, an equilibrium machine, adapted to take varying positions in accordance with the load thereon, a computing multiplying device adapted of itself to multiply price per pound and weight and obtain computed cost, means for setting said computing multiplying device in accordance with price per pound, means operable by a source of power independent of the motive power of the equilibrium machine for actuating the computing device to an extent proportional to the varying position of the scale to effect the said multiplication, means controlled by the equilibrium machine for controlling the extent of such actuation, and means associated with the said multiplying device for displaying an indication of the computed cost and for taking a printed record thereof.

38. In a computing scale, in combination, an equilibrium machine, adapted to take varying positions in accordance with the load thereon, a computing multiplying device adapted of itself to multiply price per pound and weight and obtain computed cost, means for setting said computing multiplying device in accordance with the price per pound, means operable by a source of power independent of the motive power of the equilibrium machine for actuating the computing device to an extent proportional to the varying position of the equilibrium machine to effect the said multiplication, means controlled by the equilibrium machine for controlling the extent of such actuation, and means for taking a printed record of computed cost and of the weight of the load on the equilibrium machine from the said multiplying device.

39. In a device of the class described, in combination, an equilibrium machine, means controlled by said machine to indicate and record the weight of the commodity weighed on said machine, manually controlled means to indicate and record the price per unit of weight, means controlled by the equilibrium machine and said manually controlled means to indicate and record the computed cost of the commodity weighed on the said machine, manually controlled means to indicate the initial of the salesman weighing the commodity, and means to record the same simultaneously with the recording of the computed cost.

40. In a device of the class described, in combination, an equilibrium machine, type carriers, means controlled by said machine to determine the position of the type-carriers to show the computed cost of a commodity weighed on said machine, an auxiliary source of power adapted to move said type-carriers to the position determined by the equilibrium machine, means controlled by the equilibrium machine to control the application of the power and means operated by the auxiliary source of power to take a permanent record from the positioned type-carriers.

41. In a device of the class described, in combination, an equilibrium machine, type carriers, means controlled by said machine to determine the position of type-carriers to show the computed cost of a commodity weighed on said machine, an auxiliary source of power adapted to move said type-carriers to the position determined by the equilibrium machine, means controlled by the equilibrium machine to control the application of the power, means operated by the auxiliary source of power to take a permanent record from the positioned type-carriers, and means operated by the auxiliary source of power to record a duplicate record from the positioned type-carriers.

42. In a device of the class described, in combination, an equilibrium machine, a computing machine having means to manually set up the price of the commodity, an auxiliary source of power, means controlled by the equilibrium machine to control the application of the power to operate said computing machine to correspond with the equilibrium machine, and thereby multiply the price set up therein by the number of units of weight carried by the equilibrium machine, and thereby obtain the computed cost of the commodity weighed, type-carriers adapted to be set up to the computed cost of the commodity and means driven by the auxiliary source of power for taking a record from said type-carriers.

43. In a device of the class described, in combination, an equilibrium machine, a computing machine, manually operated means for setting up the price per unit of weight, means associated with the equilibrium machine and the computing machine for multiplying the price per unit of weight and the weight carried by the equilibrium machine to obtain a product, said means comprising an auxiliary source of power to operate the computing device, means controlled by the equilibrium machine to control the application of the power, type carriers, means for setting up said product on said type carriers, recording means to take an impression from said type carriers, and means for connecting the recording means with the auxiliary source of power whereby the said recording means is driven by the said auxiliary source of power when a record is to be taken.

44. In combination, an equilibrium machine, a computing machine, manually operated means to adjust the computing machine for any particular price per unit of weight, recording means actuated by the computing machine, means to apply an auxiliary source of power to actuate the computing machine, and means actuated by said equilibrium machine for controlling the application of power to said computing machine.

45. In combination, an equilibrium machine, a member carried thereby and adapted to be displaced definitely to correspond to the weight of an article to be weighed by said machine, a computing machine, means controlled by said member and adapted to apply an auxiliary source of power to drive the computing machine, manually operated means to adjust the computing machine for any particular price per unit of weight, recording elements carried by the computing machine, and means to make records therefrom.

46. In a device of the class described, an equilibrium machine taking varying positions dependent upon the load thereon, an element connected thereto and taking corresponding positions, a computing device, setting devices to control the extent of movement of the computing devices in accordance with the price per pound of the article weighed, means independent of the equilibrium machine for moving the computing machine and limit said movement to an extent determined by the position of the said element and the said setting devices, and recording devices for recording the extent of movement of the computing devices whereby the computed cost of the commodity weighed is recorded.

47. In a device of the class described, in combination, an equilibrium machine, an index carried thereby, a member adapted to register in position with said index, recording means, computing connecting devices between the said member and said recording means, means to adjust the effective resultant ratio of the connection in accordance with any desired price per unit of weight, an auxiliary source of power and means to apply said power to drive said member to take its registering position and at the same time drive the computing connection and actuate the recording mechanism.

48. In a device of the class described, in combination, an equilibrium machine, a plurality of sets of type carriers, means controlled by the machine to determine the position of a set of said carriers to correspond to the weight of a commodity, a computing machine, means controlled by the equilibrium machine and the computing machine to determine the position of another set of said type carriers to correspond to the computed cost, an auxiliary source of power to move the said set of carriers to their previously determined positions, means for controlling the auxiliary source of power by the equilibrium machine and a common recording means for taking a record from the said sets of type carriers.

49. In a device of the class described, an equilibrium machine, a computing mechanism, a plurality of manual operated setting devices to control the movement of the said mechanism in accordance with units of price, an auxiliary source of power, means to drive the controlled computing mechanism by the auxiliary source of power in accordance with the displacement of the equilibrium machine and thereby obtain a product representing computed cost, means operated by the computing machine for indicating said computed cost, means operated by the computing machine for setting up on type carriers the computed cost and means driven by the auxiliary source of power for taking a record from the positioned type carriers.

50. In a device of the class described, in combination, an equilibrium machine, a member operated thereby taking a variable position in accordance with the weight thereon, a computing machine, manually operated means adapted to set up elements thereon to correspond to the price per pound, a recording device, means for driving the computing machine in accordance with the position of the member set by the equilibrium machine and the elements corresponding to the price per pound and connecting elements between the computing machine and the recording device whereby the computed cost of an article weighed is recorded.

51. In a device of the class described, in combination, an equilibrium machine, a computing machine, manually operated means for setting the price per pound thereon, a recording device, an auxiliary source of power, means operated by the auxiliary source of power for driving the computing machine, and limiting the movement thereof to correspond with the position of the equilibrium machine, and means to drive the recording machine in accordance with the aforesaid movement of the computing machine and in accordance with the price per pound set by the manually operated means whereby the computed cost of an article weighed is recorded.

52. In a computing scale, in combination, an equilibrium machine adapted to take varying positions in accordance with varying loads thereon, a computing multiplying device adapted of itself to multiply price per pound and weight and obtain computed cost, means for setting said computing multiplying device in accordance with price per pound, means for taking a reading of the price per pound set up on the multiplying device, motive power means independent of the motive power of the equilibrium machine for actuating the computing multiplying device in accordance with the weight on the equilibrium machine to effect the aforesaid multiplication and to thereafter restore the computing multiplying device to normal position, means controlled by the equilibrium machine for controlling the extent of said actuation, and means for taking a reading of computed cost from the said multiplying device.

53. In a computing scale, in combination, with an equilibrium machine, adapted to take varying positions in accordance with varying loads thereon, a computing multiplying device adapted of itself to multiply price per pound and weight and obtain computed cost, means for setting said computing multiplying device in accordance with the price per pound, motive power means independent of the motive power of the equilibrium machine for actuating the computing multiplying device in accordance with the weight on the equilibrium machine to affect the aforesaid multiplication and to thereafter restore the computing multiplying device to normal position, means controlled by the equilibrium machine for controlling the extent of said actuation, means for indicating and recording the price per pound, and means associated with the multiplying device for recording the weight, and for indicating and recording the computed cost.

54. In a device of the class described, in combination, an equilibrium machine, a computing machine, manually operated means to set up elements in said machine corresponding to the price per pound, indicators, connections from said means to said indicators to set up the price per pound thereon, type carriers and connections thereto to set up the price per pound on the operation of the manually operated means, an independent source of power to drive the computing machine in accordance with the elements set up thereon and in accordance with the displacement of the equilibrium machine and thereby obtain the computed cost of the commodity, a second indicator, means driven by the auxiliary source of power to set up the computed cost on said indicator, a second set of type carriers and means driven by the auxiliary source of power to set up the computed cost on the type carriers.

55. In a device of the class described, an equilibrium machine, a computing machine, manually operated means to set the computing machine in accordance with the price per pound, indicators, type carriers, means driven by the manually operated means to set certain indicators and position certain type carriers in accordance with the price per pound, an auxiliary source of power adapted to drive the computing machine in accordance with the weight on the equilibrium machine and the price per pound set up on said machine, and obtained a product means driven by said auxiliary source of power to set up said product on certain other indicators and type carriers, means driven by said auxiliary source of power to set up on certain other indicators and type carriers the weight on the equilibrium machine and means to take a record from said positioned type carriers.

56. In a computing scale, in combination with a weighing scale adapted to take varying positions in accordance with the load thereon, a computing multiplying device adapted of itself to multiply price per pound and weight and obtain computed cost, means for setting the said computing multiplying device in accordance with price per pound, means operable by a source of energy independent of the scale for actuating the computing device to an extent proportional to the varying position of the scale to effect the aforesaid multiplication, means controlled by the scale for controlling the extent of such actuation, and means for taking readings of computed cost from the said multiplying device.

57. In a computing scale, in combination with a weighing scale, adapted to take varying positions in accordance with varying loads thereon, a computing multiplying device adapted of itself to multiply price per pound and weight and obtain computed cost, means for setting said computing multiplying device in accordance with price per pound, means for taking a reading of the price per pound set up on the multiplying device, motive power means independent of the motive power of the scale for actuating the computing multiplying device in accordance with the weight on the scale to effect the aforesaid multiplication, and to thereafter restore the computing multiplying device to normal position, means controlled by the scale for controlling the extent of said actuation, and means for taking readings of computed cost from the said multiplying device.

In testimony whereof, I have subscribed my name.

EDWIN M. SCHANTZ.

Witnesses:
HENRY A. PARKS,
EDYTHE M. ANDERSON.